(12) United States Patent
Min et al.

(10) Patent No.: US 6,277,460 B1
(45) Date of Patent: *Aug. 21, 2001

(54) OPTICAL RECORDING MEDIUM

(75) Inventors: Kyung-sun Min, Yongin; Sung-hoon Kim, Seoul; Soo-hyung Lee, Yongin, all of (KR)

(73) Assignee: Samsung Electronics Co., Ltd. (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/075,198

(22) Filed: May 11, 1998

(30) Foreign Application Priority Data

Apr. 9, 1998 (KR) ................................. 98-12625

(51) Int. Cl.$^7$ ..................................... B32B 3/00
(52) U.S. Cl. .................. 428/64.1; 428/64.4; 428/64.8; 428/457; 428/913; 430/270.12; 430/495.1; 430/945; 369/275.1; 369/283; 369/288
(58) Field of Search ................. 428/64.1, 64.2, 428/64.4, 64.8, 457, 913; 430/270.11, 495.1, 945, 270.12; 369/275.1, 283, 288

(56) References Cited

U.S. PATENT DOCUMENTS

| | | |
|---|---|---|
| 4,983,440 | 1/1991 | Ikeda et al. . |
| 4,990,388 | 2/1991 | Hamada et al. . |
| 5,185,233 | 2/1993 | Santo . |
| 5,213,955 | 5/1993 | Hamada et al. . |
| 5,318,882 | 6/1994 | Ootaguro et al. . |
| 5,633,106 * | 5/1997 | Aihara et al. ................ 430/21 |
| 5,855,979 * | 1/1999 | Umehara et al. ............. 428/64.1 |

FOREIGN PATENT DOCUMENTS

| | | |
|---|---|---|
| 0 755 052 | 1/1997 | (EP) . |
| 0 777 224 | 6/1997 | (EP) . |
| 0 836 179 | 4/1998 | (EP) . |
| 02 078038 | 3/1990 | (JP) . |
| 02 128331 | 5/1990 | (JP) . |
| 3-215466 | 9/1991 | (JP) . |
| 04 111241 | 4/1992 | (JP) . |
| 8-310121 | 11/1996 | (JP) . |
| 09 081966 | 3/1997 | (JP) . |
| 10-116443 | 5/1998 | (JP) . |
| 63-268142 | 11/1998 | (JP) . |
| 8-235637 | 2/2001 | (JP) . |
| WO 97/21216 | 6/1997 | (WO) . |
| WO 98/10416 | 3/1998 | (WO) . |

* cited by examiner

*Primary Examiner*—Elizabeth Evans
(74) *Attorney, Agent, or Firm*—Burns, Doane, Swecker & Mathis LLP

(57) ABSTRACT

In the optical recording medium including a substrate having pregrooves, and a metal recording thin film, a buffering layer and a reflecting layer which are stacked in sequence on the substrate, the buffering layer is formed of one or more dyes having a refractive index (n) of 1.4 or more and an absorption coefficient (k) of 1.6 or less at a wavelength of 650 nm, and a refractive index (n) of 1.8 or more and an absorption coefficient (k) of 0.001 or more at a wavelength of 780 nm. Therefore, the optical recording medium is reproducible by a CD player and a DVD player. Also, due to a metal recording thin film layer formed on a substrate, the amplitude of a recording signal is increased and the optical reliability is also improved. Also, because of a thin buffering layer, the manufacturing costs can be reduced. Also, by adding a material whose weight is rapidly lost during decomposition to the buffering layer, the recording sensitivity and the optical reliability can be much improved.

32 Claims, 4 Drawing Sheets

OPTICAL RECORDING MEDIUM

This application claims priority under 35 U.S.C. §§119 and/or 365 to 98-12625 filed in Korea on Apr. 8, 1998; the entire content of which is hereby incorporated by reference.

BACKGROUND OF THE INVENTION

1. Field of the Invention

The present invention relates to an optical recording medium, and more particularly, to an optical recording medium which has a high reflectivity in the wavelength range of 630~790 nm, and which information can be reproduced from by a digital versatile disc player (DVDP) and a compact disc player (CDP).

2. Description of the Related Art

The recording area per recording unit of an optical recording medium is smaller than that of a conventional magnetic recording medium, so that the optical recording medium has been used as a high density recording medium. The optical recording medium is classified into read only memory (ROM) type which only reproduces already recorded information, write once read many (WORM) type which is recordable just once and readable many times, and an erasable type which is erasable and rewritable after recording. The information recorded in the optical recording medium should be reproduced by a player for the ROM type medium. To this end, the optical recording medium must satisfy specification of a conventional standardization (ORANGE BOOK), so that reflectivity of 65% or more and carrier-to-noise ratio (CNR) of 47 dB or more are required.

In a recordable optical recording medium, the recorded information can be reproduced based on a change in the reflectivity caused by a physical modification, phase change or change of magnetic properties in a recording layer before and after recording. Also, for making the optical recording medium compatible with a CD, a long-term data stability, a high recording sensitivity capable of supporting the high-speed recording rate, and economical advantages are required as well as the above mentioned high reflectivity and CNR characteristic. In order to improve the characteristics of the optical recording medium and make the manufacturing process easy, various optical recording media being formed of various materials have been suggested, and some of which are in practical use.

In response to demands for a high density optical recording medium, DVD has been developed, reproducing data by 650 nm diode laser and having 4.7 GB capacity. A DVD player can also play discs of CD format, but unfortunately cannot play discs of CD-R format, which are recordable and readable by CD equipment. For playback by DVD equipment, media should have more than 30% reflectivity at 650 nm. CD-R discs have less than 15% reflectivity at 650 nm due to high absorption of the recording layer at 600~750 nm, which prevents their use in DVD players.

As a conventional optical recording medium, Japanese Laid-open Patent Publication No. showha 63-268142 discloses a recording medium having a structure in which a sensitizing layer formed of gelatin, casein or polyvinyl alcohol (PVA), and a metal thin film formed of chromium (Cr), nickel (Ni) or gold (Au) are sequentially stacked on a substrate. According to the optical recording principle of the recording medium, the metal thin film absorbs heat of an irradiated laser beam, and thus the sensitizing layer and the metal thin film are deformed to form a recording pits. However, the recording pit of this recording medium are exposed so that it is difficult to store the recorded information on a long-term basis.

U.S. Pat. No. 4,983,440 discloses a recording medium having a structure in which two metal thin films as a recording layer, and a protecting layer for protecting the recording layer are sequentially stacked on a substrate. However, this recording medium has a very low reflectivity of 20% or less, so the recording medium is not compatible with conventional CDS.

According to U.S. Pat. No. 4,990,388, a recording medium has a light absorbing layer of a thickness of 20~500 nm, containing cyanine dye, a light reflecting layer formed of gold (Au), silver (Ag), copper (Cu), aluminum (Al) or alloys thereof, and a protecting layer are sequentially stacked on a substrate, and an intermediate layer having a thickness of 2 nm~500 µm is formed between the substrate and the light absorbing layer. The surface layer (the intermediate layer acts as a surface layer when the intermediate layer is thick) existing between the substrate and the light absorbing layer is deformed by heat generated when the light absorbing layer absorbs laser beams to form a pit for optical recording.

U.S. Pat. No. 5,213,955 discloses an optical recording medium in which a light absorbing layer having a thickness of 250~410 nm, containing dye, a light reflecting layer formed of Au, Ag, Cu, Al or alloys thereof, and a protecting layer are sequentially stacked on a substrate. In the optical recording medium, the side of substrate contacting the light absorbing layer is deformed by the laser beam to achieve optical recording.

As described above, in the conventional optical recording medium, a recording layer generates heat by absorbing laser beams to deform the substrate, thereby forming a recording pit. To this end, the recording layer contains a dye as a light absorbing material. However, because such dye is expensive, the manufacturing costs increase if the optical recording medium contains a dye. Thus, making a dye containing layer thin has been attempted, however, the recording characteristics thereof have been unfavorable.

Also, U.S. Pat. No. 5,318,882 discloses an optical recording medium having an improved stability to light and heat, which adopts a recording layer which contains a light-vulnerable organic dye, such as a cyanine dye, and a light stabilizer for complementing the dye, such as nitrosodiphenylamine and derivatives thereof. However, the optical recording medium has poor reliability and may lower the recording sensitivity, and a 3T signal is easily damaged. Also, the optical recording medium cannot be compatible with a CD player and a DVD player.

Japanese Laid-open Patent Publication No. Heisei 3-215466 discloses a recording medium having a structure in which a recording layer and a metal reflecting layer are sequentially formed on a substrate, and the recording layer contains phthalocyanine as a near infrared ray absorbent. However, the wavelength of a reading laser beam is limited to 790±20 nm, and a reflectivity at 650 nm is lower than a predetermined level, so the recording medium cannot be used for a DVD player.

SUMMARY OF THE INVENTION

To solve the above problems, it is an objective of the present invention to provide an optical recording medium which can be reproduced using any of CD player and a DVD player, and has improved stability to light and heat, recording density, and reduces manufacturing costs.

To achieve the above objective, there is provided an optical recording medium comprising a substrate having pregrooves, and a metal recording thin film layer, a buffering layer and a reflecting layer which are stacked in sequence on the substrate, wherein the buffering layer is formed of one or more dyes having a refractive index (n) of 1.4 or more and an absorption coefficient (k) of 1.6 or less at a wavelength of 650 nm, and a refractive index (n) of 1.8 or more and an absorption coefficient (k) of 0.001 or more at a wavelength of 780 nm.

Preferably, the decomposition temperature of the dye is 80~250° C.

Preferably, the thickness of the buffering layer, measured at a region corresponding to the pregrooves of the substrate, ranges between 50~200 nm in groove area.

Preferably, the buffering layer further includes an organic polymer, and the content of the organic polymer is 30 wt % or less based on the total weight of the buffering layer.

Preferably, the dye is at least one selected from the group consisting of anthraquinone, dioxadine, tripheno-dithiazine, phenanthrene, cyanine, phthalocyanine, merocyanine, pyrylium, xanthine, triphenylmethane, croconium, azo, indigoid, methine, azulene, squarium, sulfide and methal dithiolate. Also, the organic polymer may be at least one selected from the group consisting of vinylalcohol resin, vinylacetate resin, acrylate resin, polyester resin, polyether resin, polystyrene resin, polyurethane resin, cellulose resin and fatty acid resin.

Preferably, the buffering layer further includes an additive which has a decomposition or sublimation temperature of 100~200° C., and weight of which rapidly decreases during decomposition or sublimation. Also, the content of the additive may be 1~20 wt % based on the total weight of the buffering layer.

Preferably, the additive has a rate of weight decrease of 20 wt % or more based on the normal weight of the additive, when the weight decrease rate is measured at a temperature which is 50° C. higher than the decomposition or sublimation temperature of the additive.

Preferably, the additive is at least one selected from the group consisting of metallocene expressed by a formula $M(C_5H_5)_2$, where M is titanium (Ti), vanadium (V), chromium (Cr), iron (Fe), cobalt (Co), nickel (Ni), ruthenium (Ru), osmium (Os) or palladium (Pd), tetraethyllead complex, peroxide, azo compound and derivatives thereof.

Preferably, the pregroove of the substrate has a depth of 100~300 nm, a width of 100~350 nm at the bottom, and a width of 200~550 nm at the middle. Also, the pregroove of the substrate may have a "U" shape.

BRIEF DESCRIPTION OF THE DRAWINGS

The above objective and advantages of the present invention will become more apparent by describing in detail preferred embodiments thereof with reference to the attached drawings in which.

DESCRIPTION OF THE PREFERRED EMBODIMENTS

Figure 1:
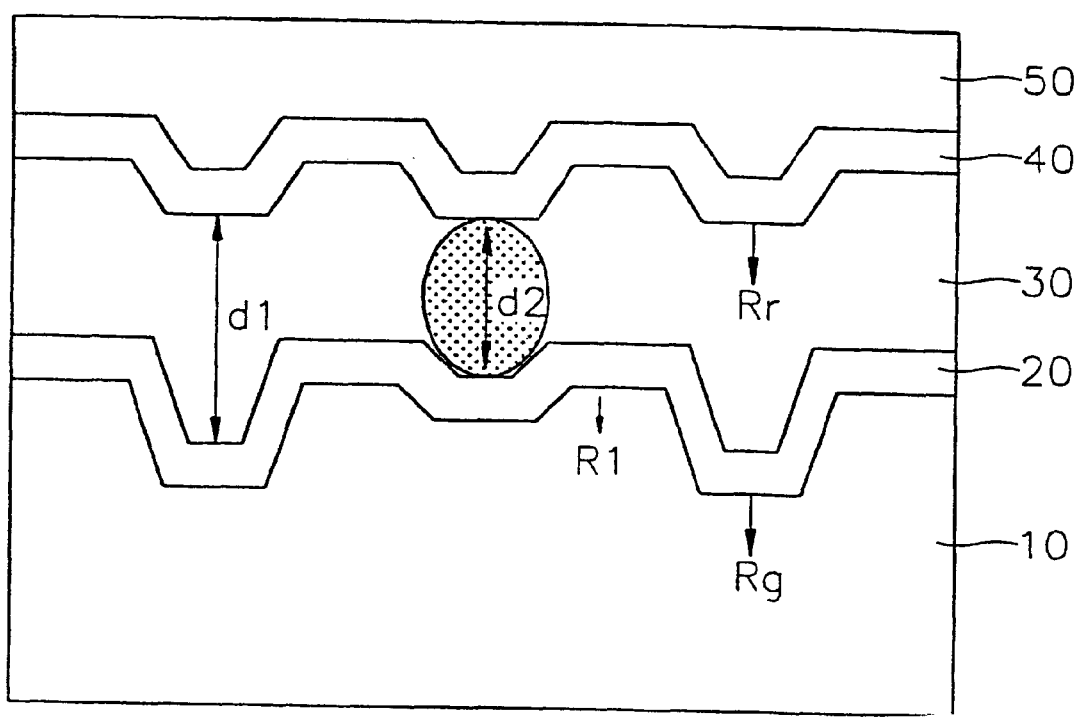
FIG. 1 is a view illustrating the structure of an optical disc and recording/reproducing principle according to a preferred embodiment of the present invention.

As shown in FIG. 1, an optical recording medium according to a preferred embodiment of the present invention includes a substrate 10 having pregrooves for guiding light for metal recording, and a recording thin film layer 20, a buffering layer 30, a reflecting layer 40 and a protecting layer 50 which are sequentially stacked on the substrate 10.

In the optical pickup according to the present invention, having the above structure, the metal recording thin film layer 20 is heated by a laser beam during optical recording, and the heat is transferred to the substrate 10 and the buffering layer 30. Accordingly, a region of the substrate 10, adjacent to the heated region of the metal recording thin film layer 20, is expanded and deformed, and the heated region of the metal recording thin film layer 20 swells out toward the buffering layer 30 by the expanding force of the substrate 10.

As described above, in the recorded portion, the substrate 10 swells up and the buffering layer 30 is deformed by heat, so the reflecting layer 40 may also be deformed. Here, the degree of deformation is proportional to the heat generated from the metal recording thin film layer 20 layer and dependent on the components and thickness of the metal recording thin film layer 20 and the buffering layer 30. In the optical recording medium of the present invention, the reflectivity of the recorded portion is lower than that of the non-recorded portion, causing a difference in the reflectivity between the recorded portion and the non-recorded portion, wherein the reflectivity difference makes recording and playback possible. Here, the reflectivity of the recorded portion is lower than that of the non-recorded portion due to the following reasons.

Figure 2:
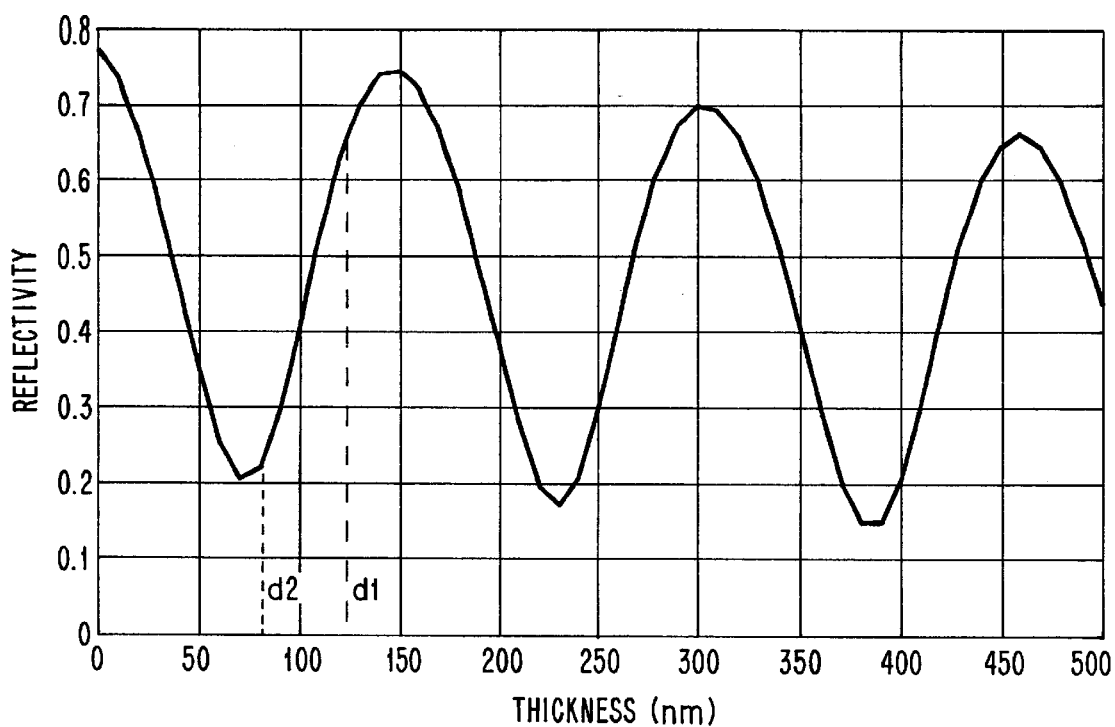
FIG. 2 is a graph showing the change in reflectivity according to the thickness of a buffering layer of the optical disc shown in FIG. 1.

First, the lower reflectivity in the recorded portion is due to a Fabry-Perot effect by the change in thickness of the buffering layer. That is, if the substrate 10 is swollen by a laser, the thickness of the buffering layer 30 is reduced to d2 after recording from d1 before recording as shown in FIG 1. Here, the reflectivity which is varied according to the thickness of the buffering layer is decreased in the recorded portion as shown in FIG. 2. That is, for the reproducing process, incident light is reflected as a reflective light Rg in the metal recording thin film layer 20 and a reflective light Rr in the reflecting layer, and the interference between the reflective lights is changed according to the thickness and refractive index of the buffering layer 30 and the thickness of the metal recording thin film layer 20, so the reflectivity is changed according to the thickness of the buffering layer 30 as shown in FIG. 2. In FIG. 2 which shows change of reflectivity depending on the thickness of the buffering layer 30, the buffering layer 30 has a refractive index (n) of 2.3 and an absorption coefficient (k) of 0.02 at 780 nm, and n of 1.14 and k of 1.5 at 650 nm.

Second, optical changes occur in the buffering layer 30. That is, if a portion of the metal recording thin film layer 20 is heated by absorbing the irradiated recording light, the temperature of the portion sharply increases. In some cases, the buffer layer 30 can absorb the writing laser beam and generate heat that depends on the k value at 780 nm. As a result, the material of the buffering layer 30 is damaged by the heat and the optical characteristics thereof are changed, causing differences in the optical paths between the non-recorded portion and the recorded portion. Thus, the reflectivity of the recorded portion decreases.

Hereinafter, characteristics required for each constituent layer of the optical recording medium according to the present invention will be described in detail.

In the optical recording medium of the present invention, grooves for guiding the light for recording or reproducing are formed in one side of the substrate 10, and the shape of pregrooves acts as an important factor on the reflectivity and tracking characteristics.

In order to make a sufficient recording signal from a thin buffering layer 30 having good reflectivity and tracking characteristics, preferably, the pregrooves formed in the substrate have a depth of 100~300 nm, a bottom width of 100~350 nm, a middle width of 200~550 nm, and substantially a "U" shape. More preferably, the pregrooves have a depth of 230~260 nm, a width of 250~260 nm at the bottom, and a width of 410~480 nm at the middle. If the depth of the pregroove is less than 100 nm, the reflectivity greatly increases by the expansion of the substrate, so that much noise is included in a recorded signal. On the contrary, if the depth of the pregoove exceeds 300 nm, the groove image of the buffer layer 30 is too deep, thereby decreasing the reflectivity. Also, if the middle and bottom widths of the pregroove are less than the above range, amplitude of a push-pull signal is decreased while the reflectivity increases, so the tracking characteristics are lowered. If the middle and bottom widths of the pregroove exceed the above range, the push-pull signal is improved while reflectivity is decreased.

In the present invention, the substrate 10 is formed of a material which is transparent to a laser beam and capable of being easily expanded and deformed by heat, and has excellent impact intensity. As a material for satisfying the above conditions, polycarbonate, polymethylmethacrylate (PMMA), epoxy resin, polyester or amorphous polyolefin is used. Preferably, the thermal deformation temperature of the resins is 80~200° C., particularly, 100~200° C.

The metal recording thin film layer 20 of the optical recording medium according to the present invention acts as a heat generating layer by absorbing a laser beam and a partial mirror for providing a contrast difference before and after recording, so a predetermined absorbance and reflectivity are required. Preferably, the metal recording thin film layer 20 has a thickness of 10~300 Å, a transmittance of 95~5% and a reflectivity of 5~95%. If the thickness is 10 Å or less, amount of heat generated by the light absorption for the recording is not sufficient to deform the substrate, 10 and the reflectivity from the metal recording thin film layer 20 is small, thereby reducing the reflectivity. On the contrary, if the thickness thereof exceeds 300 Å, the reflectivity at the metal recording thin film layer 20 increases, so scattering of the light is increased at the side of the pregrooves, thereby lowering the reflectivity of the optical recording medium. Also, expansion of the substrate 10 for recording is hindered by the metal recording thin film layer 20 and thermal conductivity of the metal recording thin film layer 20 is increased. Accordingly, heat is easily lost during recording to lower the metal recording sensitivity. Preferably, the thermal conductivity of the metal recording thin film layer 20 is 4 W/cm·° C. or less. If the thermal conductivity of the metal recording thin film layer 20 exceeds 4 W/cm·° C., it is difficult for the thin film itself to be heated to a predetermined temperature since the heat of the recording thin film, layer 20 generated by absorbing a laser beam, is rapidly diffused into its surroundings. Even if the recording thin film layer 20 is heated to the intended temperature, adjacent tracks may be deformed since the size of the recording pit is increased. Also, it is preferable that the thermal linear expansion coefficient of the metal recording thin film layer 20 is equal to or greater than $3\times10^6$ cm/° C. If the linear expansion coefficient is less than the level, the metal recording layer cracks by the expansion of the substrate during recording, so that a uniform recorded signal value cannot be obtained. Preferably, the metal recording thin film is formed of a layer 20 such as gold (Au), aluminum (Al), chromium (Cr), Al/Ti, copper (Cu), Cu/Al, nickel (Ni), platinum (Pt), silver (Ag), tantalum (Ta), iron (Fe) and titanium (Ti) or alloys thereof, wherein the metal recording thin film layer 20 has a coefficient k, greater than 0.01, of the imaginary part of a complex refractive index. If the k is less than 0.01, the deformation of the recorded portion is decreased as light absorption for recording is decreased, thereby lowering the recording sensitivity. The metal recording thin film layer 20 may be formed using a general method such as a vacuum deposition, an electron beam (E-beam) deposition and a sputtering method.

The buffering layer 20 absorbs the expansion of the substrate 10 during recording, increases interference of the reflected light at the metal recording thin film layer 20 and the reflective film, layer 40 caused by a change in its own thickness by the expansion of the substrate 10 or causes difference of optical paths between the non-recorded portion and recorded portion by its own deformation or decomposition by the heat, to make a recording signal. To this end, preferably, the buffering layer 30 is formed of a material having a large refractive index, and capable of being easily decomposed or deformed. Also, it is preferably to use a material which is easy to spin coat, thus a material having a high solubility to an organic solvent is used.

Preferably, the buffering layer 30 has a thickness of 50~200 nm and more preferably of 85~105 nm at a portion corresponding to the pregroove of the substrate 10, which is less than a conventional dye layer, as a recording layer 20, having a thickness of 150~300 nm, thereby lowering the manufacturing costs of the optical recording medium. Also, even though the buffering layer 30 is thin, the recording signal is increased to a sufficient level by a signal by the metal recording thin film 20. That is, because the recording signal is made by the interference between the reflected light at the metal recording thin film layer 20 and the reflecting layer 40, the recording signal is increased. If the buffering layer is formed to be thin, the effect of the absorption spectrum for an organic substance decreases relative to a thick buffering layer. The present invention uses a material having an absorption coefficient (k) of 1.6 or less and a refractive index (n) of 1.4 or more at 650 nm, and the absorption coefficient (k) of 0.001 or more and refractive index (n) of 1.8 or more at 780 nm, In other words the, a material has its maximum absorption peak at 680~750 nm, and preferably, one or more dye, as a major component of the buffering layer 36. Thus, a reflectivity of 30% or more can be maintained at 650 nm, so a DVD player can reproduce the information stored on the optical recording medium of the present invention.

Preferably, the decomposition temperature of the dye as the major component of the buffering layer 30 is 80~250° C.

Preferably, the dye of the present invention is anthraquinone, dioxadine, tripheno-dithiazine, phenanthrene, cyanine, phthalocyanine, merocyanine, pyrylium, xanthine, triphenylmethane, croconium, azo, indigoid, methine, azulene, squarium, sulfide or methal dithiolate.

A small amount of organic polymer may be mixed with the dye. Preferably, the organic polymer includes vinylalcohol resin, vinylacetate resin, acrylate resin, polyester resin, polyether resin, polystyrene resin, polyurethane resin, cellulose resin and fatty acid resin. Here, the content of the organic polymer is 30 wt % or less based on the total weight of the buffering layer 30.

Preferably, the buffering layer 30 further includes an additive which decomposes or sublimates at 100~200° C., and whose weight rapidly decreases during decomposition or sublimation. Assuming that the rate of weight decrease is measured at a temperature which is 50° C. higher than the decomposition or sublimation temperature of the additive, the rate of weight decrease of the additive during decomposition is 20 wt % or more based on the normal weight of the additive.

The additive may include metallocene, tetraethyllead complex, peroxide, compound azo compound and derivatives thereof. Here, metallocene, tetraethyllead complex and derivatives thereof absorb heat, and peroxide, compound azo compound and derivatives thereof emit heat when the temperature increased to the decomposition temperature or more by a recording light or heat generated from the metal recording thin film layer. Preferably, the azo compound is 2,2'-azobisisobutyronitrile (AIBN) or 1,1'-azodicarboxyldipiperidine and the peroxide compound is dicumyl peroxide.

That is, preferably, when the buffering layer 30 contains a dye which emits heat due to the recording light or the heat of the metal recording thin film layer 20, an additive, which absorbs heat during decomposition, is used. Meanwhile, it is preferable that an additive which emits heat during decomposition is used when the dye of the buffering layer 30 absorbs heat due to the recording light or the heat of the recording thin film layer 20.

The additives increase recording sensitivity, improves optical reliability in a case, and controls and maintains the degree of deformation of the buffering layer 30, to improve BLER and jitter after recording. The content of the additive is preferably 1~20wt % based on the total weight of the buffering layer 30. If the content of the additive exceeds 20 wt %, the recording characteristics are damaged. On the contrary, if the content thereof is less than 1 wt %, the effect of the additive is negligible.

Figure 3A:
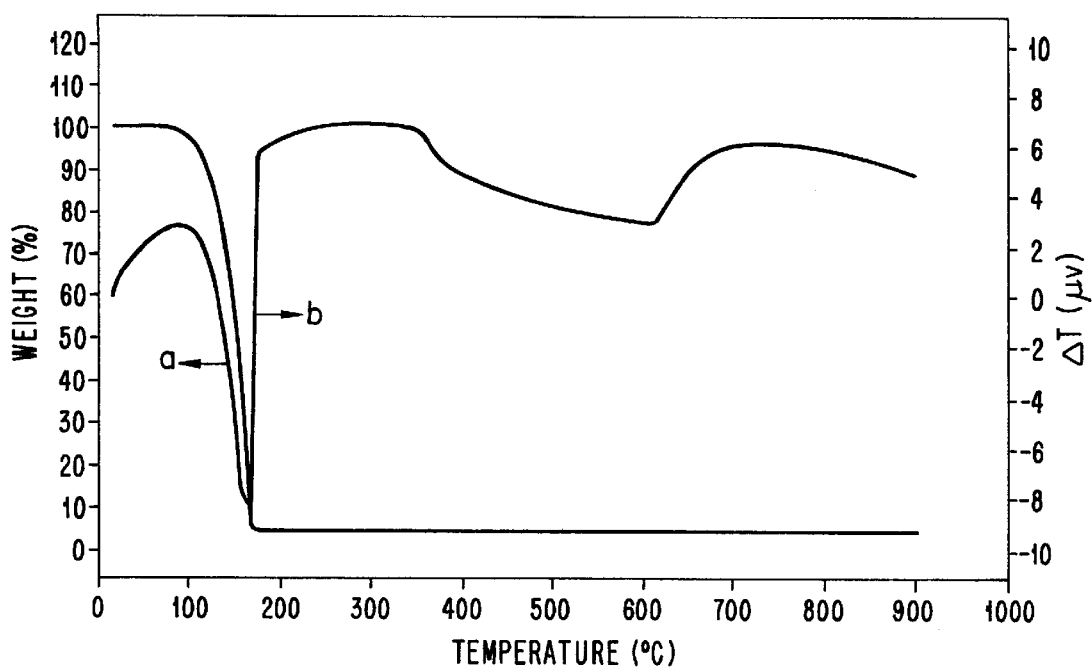
FIGS. 3A and 3B are graphs showing the results of thermal analysis and weight decrease on an additive used for forming a buffering layer of an optical disc according to the present invention.

Metallocene, as one of the possible additives, is a general term referring to a molecule having a sandwich structure such as a non-electrolyte complex of biscyclopentadienyl compound. The metallocene is expressed by a formula $M(C_5H_5)_2$, where M is titanium (Ti), vanadium (V), chromium (Cr), iron (Fe), cobalt (Co), nickel (Ni), ruthenium (Ru), osmium (Os) or palladium (Pd), and which mostly have a sublimation property of losing weight rapidly. The metallocene may be ferrocene or derivatives thereof. FIG. 3A is a graph showing rate of weight decrease ("a") and thermal analysis ("b") of ferrocene, which is metallocene when M is Fe. As shown in FIG. 3A, rapid weight loss occurs near 100° C. The metallocene is indirectly heated when the metal recording thin film layer 20 or the dye of the buffering layer 30 emits heat by absorbing laser beams during recording, so decomposed or sublimated by adsorbing heat. If the dye, as the major component of the buffering layer 30, emits heat during decomposition, the area of a region in which the dye is decomposed can be controlled by adding an additive such as metallocene which absorbs heat during decomposition. That is, the dye is completely decomposed only in the recorded portion.

Figure 3B:
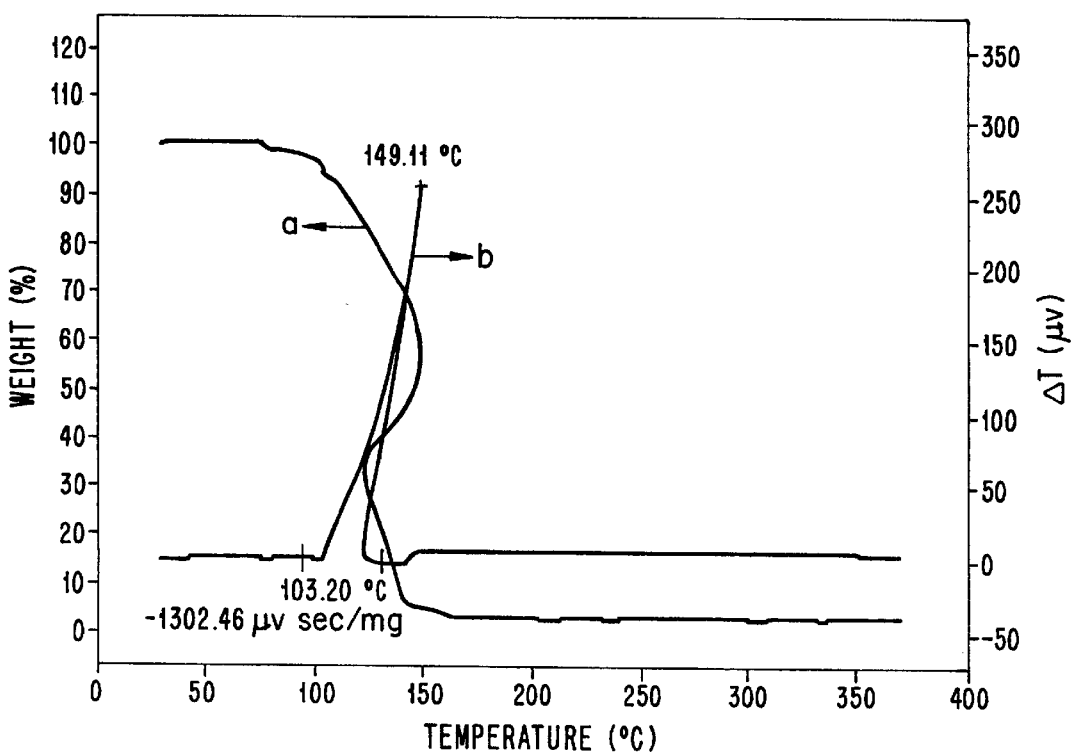

Meanwhile, the azo compound or peroxide compound is indirectly decomposed by the metal recording thin film layer 20 or dye during recording, emitting heat. Because the azo compound or peroxide compound is decomposed at a low temperature, the decomposition temperature of the buffering layer is lowered. Thus, if the dye of the buffering layer 30 emits heat during decomposition, the area of a region in which the dye is decomposed can be controlled by adding the azo compound or peroxide compound which emits heat during decomposition, so the complete dye decomposition occurs only in the recorded portion. FIG. 3B is a graph showing rate of weight decrease ("a") and thermal analysis ("b") of AIBN which loses weight below 150° C.

As described above, as the additives rapidly lose weight during decomposition or sublimation due to the above-described properties, the boundary of the recorded portion and non-recorded portion becomes distinct, so the recording characteristics (BLER, jitter, etc.) of the recording signal are improved. Also, the additive acts as a removing agent for removing singlet oxygen generated when a disc is exposed to light, thereby improving optical reliability.

In the present invention, the buffering layer 30 is formed of the above-described materials by a general method. For example, after dissolving the above materials for the buffering layer 30 in an organic solvent, the resultant solution is spin-coated on the metal recording thin film layer 20, resulting in the buffering layer 30. Here, the organic solvent is not limited as long as if the organic solvent does not damage the substrate 10, and can be easily dissolved in an organic solvent.

The reflecting layer 40, for a high reflectivity during recording or reproducing, is formed of a metal having a high thermal conductivity and high reflectivity to prevent easy deformation. Thus, the reflecting layer 40 is formed of Au, Al, Cu, Cr, Ag, Ti or alloys thereof, to a thickness of 500~2,500 Å by a vacuum deposition or sputtering method.

The protecting layer 50 protects other constituent layers of the optical recording medium. The protecting layer 50 is formed by a conventional method. For example, the protecting layer 50 is formed by spin-coating on the reflecting layer 40 an epoxyacrylate resin or acrylate resin which is transparent and curable by ultraviolet rays, and impact intensity, and then curing the spin-coated product by irradiating.

In the optical recording medium of the present invention, having the above-described structure, the dye layer 30, e.g., the buffering layer, is formed to be very thin, to reduce the amount of use of the dye, thereby lowering the manufacturing costs of the optical recording medium. Also, because the reflectivity is 60% or more at 770~790 nm and 30% or more at 630~660 nm, reproduction by a DVD player is possible, and the optical reliability as well as the recording sensitivity are improved.

Hereinafter, the present invention will be described in detail with reference to the following examples. However, the present invention is not limited to the following examples.

In the following examples, rate of weight decrease is defined as the weight is measured at a temperature which is 50° C. higher than the decomposition or sublimation temperature of the additive with respect to the normal weight of the additive.

EXAMPLE 1

A nickel (Ni) recording thin film was vacuum-deposited to a thickness of 8 nm on a polycarbonate (PC) substrate with a thickness of 1.2 mm having pregrooves with a depth of 260 nm, a width of 250 nm at the bottom thereof, a width of 477 nm at the middle thereof and a track pitch of 1.6 μm. Then, a coating solution obtained by dissolving a dye mixture of 0.262 g (L-04:S-04=1:3, where L-04 (Japanese Institute for Photosensitizing Dyes) has refractive index (n) of 2.3, absorption (k) of 0.02 at 780 nm, and refractive index (n) of 1.14 and absorption (k) of 1.5 at 650 nm, and decomposition temperature of 238° C., and S-04 (Japanese Institute for Photosensitizing Dyes) has refractive index (n) of 2.8, absorption (k) of 0.001 at 780 nm, and refractive index (n) of 1.5 and absorption (k) of 1.5 at 650 nm, and decomposition temperature of 231° C.) and ferrocene of 0.026 g (sublimation temperature of 110° C. and rate of weight decrease of 100 wt %; ferrocene having a melting point of 174° C. and a decomposition temperature of 400° C. starts to sublimate at 100° C. by heating, and completely sublimates at 150° C. without any residue) in 10 ml diacetone alcohol (DAA) was spin-coated on the Ni recording thin film at 4,000 rpm to form a buffering layer. Here, the thickness of the buffering layer corresponding to the pregroove portion, measured by a scanning electron microscope (SEM), was about 90 nm. After drying the resultant structure at 40° C. for 4 hours in a vacuum oven, Ag was vacuum-deposited to a thickness of about 1,000 Å to form a reflecting layer. Then, an ultraviolet (UV)-curable epoxyacrylate resin was spin-coated on the reflecting layer and then cured to form a protecting layer, resulting in a disc.

Figure 4:
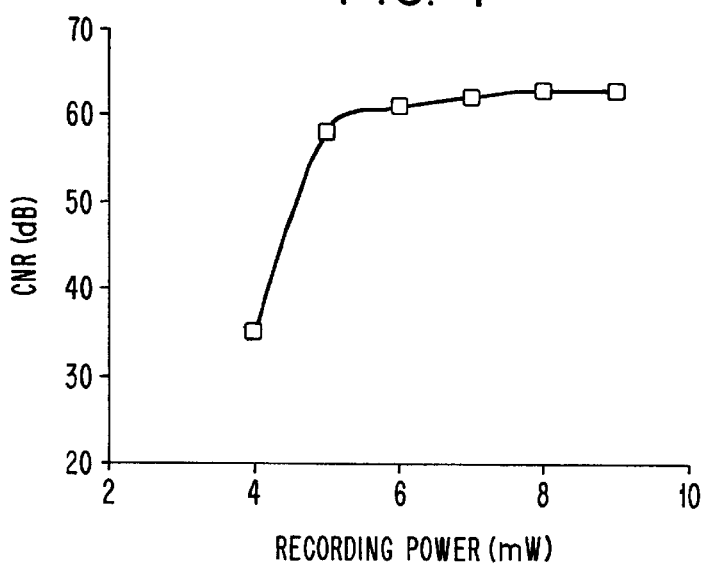
FIG. 4 is a graph showing the change in the carrier-to-noise ratio (CNR) according to the recording power of an optical disc according to a preferred embodiment of the present invention.

According to the results of the evaluation on the obtained disc, using a tester adopting a laser beam of 780 nm, reflectivity before recording was 70%, and the maximum reflectivity $R_{top}$ was 66% and the CNR was 63 dB using a 0.7 mW recording laser power with respect to a disc which was recorded at a recording speed of 1.3 m/sec using 8 mW, 720 kHz recording power. Under the above recording conditions, a recorded signal of 47 dB or more CNR was reproduced with a recording power of 5 mW or more as shown in FIG. 4. Also, after recording an audio signal in the disc at 2× and 4× speeds using a CD-R recorder (400tx, Yamaha, Japan), the recorded audio signal could be reproduced using a CD player (Mark II, Philips). According to the recording characteristics of the disc, evaluated by a CD-CATS (Audio Development Co., Sweden), all items evaluated satisfied the standard of the CD (Orange Book Part II).

Figure 5:
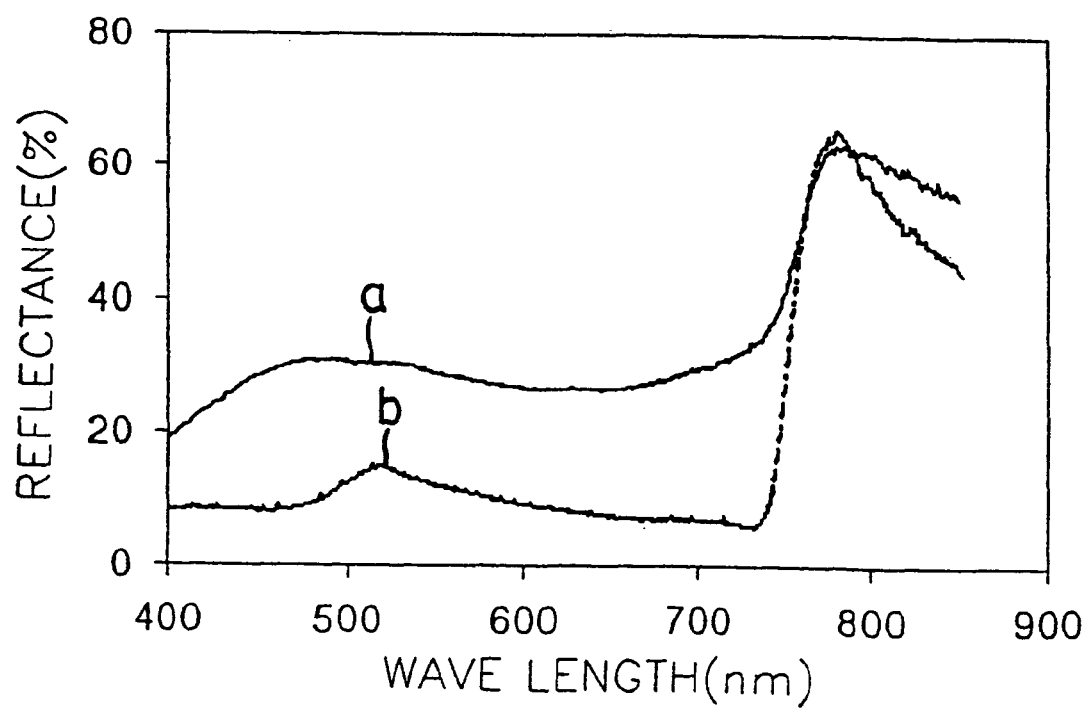
FIG. 5 shows change in reflectivity according to the wavelength of a reproducing light in the optical disc of the present invention and a conventional optical disc (Dye CD-R).

Also, the reflectivity of the disc, measured by a UV spectrometer (UV-310 PC, Shimadzu, Japan), was 30% or higher at a wavelength of 650 nm, as shown in FIG. 5 (graph "a"). Thus, it is evident that information recorded in the disc could be reproduced by a digital versatile disc player (DVDP) and actually by a DVD player (SD-3000, Toshiba, Japan). For comparison, the reflectivity of a Dye CD-R which is a conventional optical recording medium, having a thick dye layer, as a recording layer, was measured by the same method, and the result is shown as graph "b" in FIG. 5. As shown in FIG. 5, the CD-R has a high reflectivity only at 780 nm while having a reflectivity lower than 30% near 650 nm. Thus, it is evident that the conventional dye type optical disc could be reproduced by only a CD player, not a DVD player

EXAMPLE 2

A tantalum (Ta) recording thin film was vacuum-deposited to 8 nm thickness on a polycarbonate (PC) substrate with a thickness of 1.2 mm having pregrooves with a depth of 230 nm, a width of 250 nm at the bottom thereof, a width of 410 nm at the middle thereof and a track pitch of 1.6 μm. Then, a coating solution obtained by dissolving 0.3 g of dye mixture (L-04:Luxol Fast Blue=1:1, where L-04 (Japanese Institute for Photosensitizing Dyes) has refractive index (n) of 2.3, absorption (k) of 0.02 at 780 nm, and refractive index (n) of 1.14 and absorption (k) of 1.5 at 650 nm, and decomposition temperature of 238° C., and Luxol Fast Blue (Aldrich Co.) has refractive index (n) of 1.8, absorption (k) of 0.003 at 780 nm, and refractive index (n) of 1.6 and absorption (k) of 0.4 at 650 nm, and decomposition temperature of 250° C.) and 0.3 g of AIBN (decomposition temperature of 110° C. and rate of weight decrease of 100 wt %; AIBN is completely volatilized at its original decomposition temperature) in 10 ml diacetone alcohol (DM) was spin-coated on the Ta recording thin film at 4,000 rpm to form a buffering layer having a thickness of 100 nm. Hereinafter, the same steps as those of Example 1 were performed to manufacture an optical disc, and the performance of the disc was evaluated.

The reflectivity before recording, measured using a laser beam of 780 nm, was 69.7%, and the maximum reflectivity $R_{top}$ was 65% and the CNR was 65 dB after recording. Also, after recording an audio signal in the disc using a recorder (RPD-1000, Pioneer, Japan), the recorded audio signal could be reproduced using a CD player (Mark II, Philips). According to the recording characteristics of the disc, evaluated by a CD-CATS (Audio Development Co., Sweden), all items evaluated satisfied the standard of the CD (Orange Book Part II). Also, the reflectivity of the disc was 42% at a wavelength of 650 nm. Thus, it is evident that information recorded in the disc could be reproduced by a DVDP.

EXAMPLE 3

An optical disc having a buffering layer with a thickness of 85 nm was manufactured by the same method as that of Example 1, except that a substrate having pregrooves with a depth of 230 nm, a width of 250 nm at the bottom thereof, a width of 470 nm at the middle thereof was used, and the performance of the disc was evaluated.

According to the results of the performance evaluation, the reflectivity at 780 nm before recording, measured using a laser beam of 780 nm, was 72%, and the maximum reflectivity $R_{top}$ was 68% and the CNR was 62 dB after recording. The recording characteristics of the disc, evaluated after recording an audio signal in the disc at a velocity of 2× and 4× using a CD-R recorder (400tx, Yamaha, Japan), satisfied the standard of the CD.

Also, the reflectivity at 650 nm was 44%, so the recorded audio signal could be reproduced using a DVDP.

EXAMPLE 4

An optical disc having a buffering layer with a thickness of 90 nm was manufactured by the same method as that of Example 1, except that a metal recording thin film was formed of Al., and the performance of the disc was evaluated.

According to the results of the performance evaluation, the reflectivity before recording, measured using a laser beam of 780 nm, was 71%, and the maximum reflectivity $R_{top}$ was 65% and the CNR of a recording signal was 62 dB after recording at a rate of 1.3 m/sec. Also, the reflectivity at 650 nm was 32%. That is, after recording an audio signal in the disc using a CD recorder, the recorded audio signal could be reproduced using a CDP and DVDP.

EXAMPLE 5

An optical disc having a buffering layer with a thickness of 95 nm was manufactured by the same method as that of Example 1, except that 1,1-dimethylferrocene (decomposition temperature of 107° C. and rate of weight decrease of 100 wt %, Aldrich Co.) was used instead of ferrocene used in Example 1. According to the results of the performance evaluation, the maximum reflectivity $R_{top}$ was 66% at 780 nm, the CNR was 63 dB, and the reflectivity at 650 nm was 34%. After recording an audio signal in the disc, the recorded audio signal could be reproduced using a CDP and DVDP. Also, the recording characteristics of the disc, evaluated by a CD-CATS, satisfied the standard of the CD.

EXAMPLE 6

An optical disc having a buffering layer with a thickness of 105 nm was manufactured by the same method as that of Example 1, except that dicumyl peroxide (decomposition temperature of 117° C. and rate of weight decrease of 100 wt %, Aldrich Co.) was used instead of AIBN used in Example 2. According to the result of the performance evaluation, the maximum reflectivity $R_{top}$ was 65% at 780 nm, the CNR was 62 dB, and the reflectivity at 650 nm was 35%. After recording an audio signal in the disc, the recorded audio signal could be reproduced using a CDP and DVDP. Also, the recording characteristics of the disc, evaluated by a CD-CATS, satisfied the standard of the CD.

Comparative Examples 1 and 2

An optical disc was manufactured by the same method as that of Example 1, except that only 0.28 g of a mixture of L-04 and S-04 was used to form a buffering layer instead of using the ferrocene (Comparative Example 1) and the Ni recording thin film was not used (Comparative Example 2).

Optimal recording power at a recording rate of 2.4 m/sec was measured based on β4%, on discs obtained by the Comparative examples 1 and 2, and Example 1. As a result, the optical recording power was 10.5 mW in the disc of Example 1, 12 mW of the Comparative Example 1 and 13 mW of the Comparative Example 2. That is, it can be known that Example 1 requires less recording power than the Comparative Examples, so the recording sensitivity of the disc prepared by Example 2 is improved. Thus, the effects of the metal thin film and additive used in the present invention are proven. Also, after recording, BLER and reflectivity were measured at a power of 0.53 kW/mw using a xenon lamp, a relative humidity of 50% and a temperature of 40° C. in order to test the optical reliability of the disc. As a result, the BLER and reflectivity of the disc of Example 1 were 20 and 66%, respectively, without changes. However, in the case of the disc of Comparative Example 1, the BLER was changed from 50 to 1200 after 96 hours. Also, the BLER of the disc of Comparative Example 2, which was 10 initially, was seriously damaged to an extent such that BLER could not be measured after 96 hours. That is, the metal thin film of the present invention lower the BLER, improving the optical reliability.

Comparative Example 3

An optical disc was manufactured by the same method as that of Example 1, except that a substrate having pregrooves with a depth of 80 nm, a width of 100 nm at the bottom thereof, and a width of 350 nm at the middle thereof, and a coating solution obtained by dissolving 0.23 g of dye mixture (L-04:S-04=1:1) and 0.26 g ferrocene in 10 ml diacetone alcohol (DM), were used. The reflectivity of the optical disc before recording was 67% at 780 nm. However, $I_{11R}$, which is a ratio representing the amplitude of the recording signal when an audio signal is recorded at 2× speeds by a recorder (Yamaha, Japan), was 0.55, which is less than the Standard of 0.60. Also, jitter was 50~60 ns, which is higher than the Standard of 35 ns or less. Thus, the recorded audio signal could not be reproduced by a CD player.

Comparative Example 4

An optical disc was manufactured by the same method as that of Example 1, except that a substrate having V-shaped pregrooves with a depth of 260 nm, a width of 30 nm at the bottom thereof, and a width of 300 nm at the middle thereof was used.

According to the results of the performance evaluation, the BLER was 1500, jitter was 50 ns or more, and the maximum reflectivity $R_{top}$ was 65% at 780 nm, so the reproduction was possible. However, the recording characteristics were poor.

As described above, the optical recording medium of the present invention is recordable, and reproducible using a reproducing light having a wavelength of 630~790 nm, particularly, by a DVD player using a reproducing light having a short wavelength of 630~660 nm and a CD player using a reproducing light having a long wavelength of 770~790 nm. Also, due to a metal recording thin film formed on a substrate, the amplitude of a recording signal is increased and the optical reliability is also improved. Also, because of a thin buffering layer, the manufacturing costs can be reduced. Also, by adding a material whose weight is rapidly lost during decomposition to the buffering layer, the recording sensitivity and the optical reliability can be much improved.

What is claimed is:

1. An optical recording medium comprising:
    a substrate having pregrooves;
    a metal recording thin film layer;
    a buffering layer; and
    a reflecting layer, wherein said recording thin film layer, said buffering layer and said reflecting layer appear in sequence on the substrate, and
    wherein the buffering layer is formed of one or more dyes having a refractive index (n) of 1.4 or more and an absorption coefficient (k) of 1.6 or less at a wavelength of 650 nm, and a refractive index (n) of 1.8 or more and an absorption coefficient (k) of 0.001 or more at a wavelength of 780 nm.

2. The optical recording medium of claim 1, wherein the decomposition temperature of the dye is 80–250° C.

3. The optical recording medium of claim 1, wherein the thickness of the buffering layer, measured at a region corresponding to the pregrooves of the substrate, ranges between 50–200 nm.

4. The optical recording medium of claim 1, wherein the thickness of the buffering layer, measured at a region corresponding to the pregrooves of the substrate, ranges between 85–105 nm.

5. The optical recording medium of claim 1, wherein the buffering layer further includes an organic polymer.

6. The optical recording medium of claim 5, wherein the content of the organic polymer is 30 wt % or less based on the total weight of the buffering layer.

7. The optical recording medium of claim 5, wherein the organic polymer is at least one selected from the group consisting of vinylalcohol resin, vinylacetate resin, acrylate resin, polyester resin, polyether resin, polystyrene resin, polyurethane resin, cellulose resin and fatty acid resin.

8. The optical recording medium of claim 6, wherein the organic polymer is at least one selected from the group consisting of vinylalcohol resin, vinylacetate resin, acrylate resin, polyester resin, polyether resin, polystyrene resin, polyurethane resin, cellulose resin and fatty acid resin.

9. The optical recording medium of claim 1, wherein the dye is at least one selected from the group consisting of anthraquinone, dioxadine, tripheno-dithiazine, phenanthrene, cyanine, phthalocyanine, merocyanine, pyrylium, xanthine, triphenylmethane, croconium, azo, indigoid, methine, azulene, squarium, sulfide and methal dithiolate.

10. The optical recording medium of claim 2, wherein the dye is at least one selected from the group consisting of anthraquinone, dioxadine, tripheno-dithiazine, phenanthrene, cyanine, phthalocyanine, merocyanine, pyrylium, xanthine, triphenylmethane, croconium, azo, indigoid, methine, azulene, squarium, sulfide and methal dithiolate.

11. The optical recording medium of claim 1, wherein the buffering layer further includes an additive which has a decomposition or sublimation temperature of 100–200° C., and weight of which rapidly decreases during decomposition.

12. The optical recording medium of claim 5, wherein the buffering layer further includes an additive which has a decomposition or sublimation temperature of 100–200° C., and weight of which rapidly decreases during decomposition.

13. The optical recording medium of claim 11, wherein the additive has a rate of weight decrease of 20 wt % based on the normal weight of the additive, when the weight decrease rate is measured at a temperature which is 50° C. higher than the decomposition temperature of the additive.

14. The optical recording medium of claim 11, wherein an additive emitting heat during decomposition is used when a dye, which absorbs heat during decomposition by taking a recording light or heat generated by the metal recording thin film layer onto which the recording light has irradiated, is used for the buffering layer.

15. The optical recording medium of claim 14, wherein the additive emitting heat during decomposition is at least one selected from the group consisting of azo compound, peroxide compound and derivatives thereof.

16. The optical recording medium of claim 15, wherein the azo compound is 1,1'-azobisisobutyronitrile (AIBN).

17. The optical recording medium of claim 15, wherein the peroxide compound is dicumyl peroxide.

18. The optical recording medium of claim 11, wherein an additive absorbing heat during decomposition is used when a dye, which emits heat during decomposition by absorbing a recording light or heat generated by the metal recording thin film layer onto which the recording light has irradiated, is used for the buffering layer.

19. The optical recording medium of claim 18, wherein the additive absorbing heat during decomposition is at least one selected from the group consisting of metallocene, tetraethyllead complex and derivatives thereof, wherein the metallocene is expressed by a formula $M(C_5H_5)_2$, where M is titanium (Ti), vanadium (V), chromium (Cr), iron (Fe), cobalt (Co), nickel (Ni), ruthenium (Ru), osmium (Os) or palladium (Pd).

20. The optical recording medium of claim 19, wherein the metallocene is ferrocene and derivatives thereof.

21. The optical recording medium of claim 11, wherein the content of the additive is 1–20 wt % based on the total weight of the buffering layer.

22. The optical recording medium of claim 11, wherein the additive is at least one selected from the group consisting of metallocene, tetraethyllead complex, peroxide compound, azo compound and derivatives thereof, wherein metallocene is expressed by a formula $M(C_5H_5)_2$, where M is titanium (Ti), vanadium (V), chromium (Cr), iron (Fe), cobalt (Co), nickel (Ni), ruthenium (Ru), osmium (Os) or palladium (Pd).

23. The optical recording medium of claim 1, wherein the pregroove of the substrate has a depth of 100–300 nm, a width of 100–350 nm at the bottom, and a width of 200–550 nm at the middle.

24. The optical recording medium of claim 23, wherein the pregroove of the substrate has a depth of 230–260 nm, a width of 250–260 nm at the bottom, and a width of 410–480 nm at the middle.

25. The optical recording medium of claim 1, wherein the pregroove of the substrate substantially has a "U" shape.

26. The optical recording medium of claim 1, wherein information on the optical recording medium is compatibly reproducible at a wavelength of 630–790 nm.

27. The optical recording medium of claim 1, wherein the optical recording medium has a reflectivity of 60% or more at a long wavelength of 770–790 nm, and a reflectivity of 30% or more at a short wavelength of 630–660 nm.

28. The optical recording medium of claim 26, wherein the optical recording medium has a reflectivity of 60% or more at a long wavelength of 770–790 nm, and a reflectivity of 30% or more at a short wavelength of 630–660 nm.

29. The optical recording medium of claim 1, further comprising a protecting layer on the reflecting layer.

30. An optical recording medium comprising:
a substrate having pregrooves;
a metal recording thin film layer;
a buffering layer; and
a reflecting layer,
wherein said recording thin film layer, said buffering layer and said reflecting layer appear in sequence on the substrate,
wherein the buffering layer includes one or more dyes having a refractive index (n) of 1.4 or more and an absorption coefficient (k) of 1.6 or less at a wavelength of 650 nm, and a refractive index (n) of 1.8 or more and an absorption coefficient (k) of 0.001 or more at a wavelength of 780 nm, and an additive having a decomposition or sublimation temperature of 100–200° C., and
wherein the additive has a rate of weight decrease of 20 wt % based on the normal weight of the additive when the weight decrease rate is measured at a temperature which is 50° C. higher than the decomposition or sublimation temperature of the additive, and said buffering layer has a thickness of 50–200 nm at a region corresponding to the pregrooves of the substrate.

31. The optical recording medium of claim 1, wherein the refractive index (n) of said buffering layer is greater at a wavelength of 780 nm than at a wavelength of 650 nm and wherein the absorption coefficient (k) is at least an order of magnitude less at a wavelength of 780 nm than at a wavelength of 650 nm.

32. The optical recording of claim 30, wherein the refractive index (n) of said buffering layer is greater at a wavelength of 780 nm than at a wavelength of 650 nm and wherein the absorption coefficient (k) is at least an order of magnitude less at a wavelength of 780 nm than at a wavelength of 650 nm.

* * * * *